(12) United States Patent
Paclik et al.

(10) Patent No.: US 8,451,746 B2
(45) Date of Patent: *May 28, 2013

(54) CONCURRENCY METHOD FOR FORECASTING IMPACT OF SPEED TIERS ON CONSUMPTION

(75) Inventors: John Paclik, Cherry Hill, NJ (US); Amit Garg, Delran, NJ (US); Saifur Rahman, Lindenwold, NJ (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 51 days.

This patent is subject to a terminal disclaimer.

(21) Appl. No.: 13/221,105

(22) Filed: Aug. 30, 2011

(65) Prior Publication Data

US 2011/0310772 A1 Dec. 22, 2011

Related U.S. Application Data

(63) Continuation of application No. 12/504,394, filed on Jul. 16, 2009, now Pat. No. 8,018,869.

(51) Int. Cl.
*H04L 12/26* (2006.01)
(52) U.S. Cl.
USPC .......................................... 370/252; 370/468
(58) Field of Classification Search
USPC ................................. 370/252, 468
See application file for complete search history.

(56) References Cited

U.S. PATENT DOCUMENTS 8,018,869 B2 * 9/2011 Paclik et al. .................. 370/252
2010/0290350 A1 11/2010 Finkelstein et al.

OTHER PUBLICATIONS

Rahman, Saifur. "DOCSIS Migration Methodology," Communications Technology, Nov. 1, 2007, pp. 1-6, retrieved online on Jun. 6, 2009, at: <http://www.cable360.net/ctldata/DOCSIS-Migration-Methodology_26403.html>.

* cited by examiner

*Primary Examiner* — Melvin Marcelo
(74) *Attorney, Agent, or Firm* — Banner & Witcoff, Ltd.

(57) ABSTRACT

A forecast model processes performance data from a site, e.g., a cable modem termination system (CMTS), to obtain a set of concurrency equations for existing speed tiers that is based on an observed subscriber bandwidth for the site. A new set of concurrency equations is obtained for new speed tiers so that a new subscriber bandwidth can be predicted for the new speed tiers. Based on the new subscriber bandwidth, expected subscriber growth, and changes in data consumption, the site is reconfigured with additional ports based on the forecast. This process can be repeated for the other sites. Sites may be grouped together based on the observed subscriber bandwidth. A new subscriber bandwidth may be predicted for the group with the new speed tiers so that additional ports can be configured for each of the sites in the group.

20 Claims, 12 Drawing Sheets

| Observed BW/sub | Penetrations | | | | Solver Coefficients | | | | Calculated BW | Target BW |
|---|---|---|---|---|---|---|---|---|---|---|
| Total Max of DS_BW_Sub | % 16 | % 8 | % 6 | % 4 | 0.768 | 16 | 8 | 6 | | |
| 129.4430323 | 3.28% | 13.05% | 77.02% | 6.13% | 0.32% | 14.37779 | 16.25877 | 22.70479 | 129.4430331 | 127.26157 |
| 125.0801069 | 0.59% | 13.04% | 78.37% | 6.49% | 0.34% | | | | 125.0801067 | |
| 0.99% | 7.26% | 85.04% | 0.11% | 6.60% | | | | | | |
| 86.59060051 | | | | | | | | | | |
| 85.94432402 | 9.75% | 9.86% | 77.62% | 2.04% | 0.20% | 9.433283 | 13.87736 | 14.95212 | 84.895012 | 81.711299 |
| 85.34668954 | 0.33% | 5.30% | 74.01% | 14.90% | 5.46% | | | | 85.94432438 | |
| 83.45233333 | 0.16% | 7.30% | 83.89% | 1.27% | 7.14% | | | | 72.45703923 | |
| 81.80778729 | 0.33% | 25.64% | 59.25% | 13.28% | 1.04% | | | | 83.45233308 | |
| | | | | | | | | | 81.80778839 | |

Use Solver to get Coefficients

FIG. 4

CONCURRENCY METHOD FOR FORECASTING IMPACT OF SPEED TIERS ON CONSUMPTION

CROSS-REFERENCE TO RELATED APPLICATIONS

The present application claims priority to, and is a continuation of, U.S. patent application Ser. No. 12/504,394, filed Jul. 16, 2009, and entitled, "Concurrency Method for Forecasting Impact of Speed Tiers on Consumption," hereby incorporated by reference as to its entirety.

TECHNICAL FIELD

Aspects of the embodiments relate to estimating the impact of new data (speed) tiers on a service provider's equipment, e.g., cable modem termination systems (CTMSs).

BACKGROUND

A cable modem termination system (CMTS) is equipment typically found in a cable company's headend (hubsite) and is used to provide high speed data services, e.g., cable internet or Voice over IP, to cable subscribers. A CMTS often functions as a router with Ethernet interfaces (connections) on one side and coax RF interfaces on the other side. The RF/coax interfaces may carry RF signals to and from the subscriber's cable modem.

CMTSs typically carry only IP traffic. Traffic destined for the cable modem from the Internet, often designated as downstream traffic, is carried in IP packets encapsulated in Moving Picture Experts Group (MPEG) transport stream packets. The MPEG packets are carried on data streams that are typically modulated onto a TV channel using Quadrature Amplitude Modulation (QAM). Upstream data (data from cable modems to the headend or Internet) is carried in Ethernet frames modulated with QPSK, 16-QAM, 32-QAM, 64-QAM, or S-CDMA. Transmission is often through the sub-band portion of the cable TV spectrum (also known as the "T" channels), which is a lower part of the frequency spectrum than the downstream signal.

In order to provide high speed data services, a cable company typically connects its headend to the Internet via very high capacity data links to a network service provider. On the subscriber side of the headend, the CMTS enables the communication with subscribers' cable modems. Different CMTSs are capable of serving different cable modem population size, ranging from 4,000 cable modems to 150,000 or more, depending in part on traffic. A given headend may have between half a dozen to a dozen or more CMTSs to service the cable modem population served by that headend or hybrid fiber coax (HFC) hub. CMTSs may have both Ethernet interfaces as well as RF interfaces. In this way, traffic that is coming from the Internet can be routed through the Ethernet interface, through the CMTS and then onto the RF interfaces that are connected to the cable company's HFC hub. The traffic typically winds its way through the HFC to end up at the cable modem in the subscriber's home. Traffic going from a subscriber's home systems go through the cable modem and out to the Internet in the opposite direction.

Cable subscribers are typically assigned to a specific CMTS, in which each subscriber is provided grades of data services. It is therefore important that the cable provider engineer the CMTSs so that subscribers experience the expected quality of service.

BRIEF SUMMARY

The following presents a simplified summary of the disclosure in order to provide a basic understanding of some aspects. It is not intended to identify key or critical elements of the embodiments or to delineate the scope of the embodiments. The following summary merely presents some concepts of the disclosure in a simplified form as a prelude to the more detailed description provided below.

A forecast model processes performance data from a site, e.g., a cable modem termination system (CMTS), to obtain a set of concurrency equations for existing speed tiers that is based on an observed subscriber bandwidth for the site. A new set of concurrency equations is obtained for new speed tiers, and a forecasted subscriber bandwidth is predicted for the new speed tiers. Based on the forecasted subscriber bandwidth, expected subscriber growth, and changes in data consumption, the site is reconfigured with additional ports in accordance with the forecast model. This process can then be repeated for the other sites.

With another aspect of the embodiments, sites may be grouped together based on the observed subscriber bandwidth. A forecasted subscriber bandwidth can be predicted for the group with the new speed tiers so that additional ports can be configured for each of the sites in the group.

With another aspect of the embodiments, updated performance data reflects changed data consumption characteristics for a site. Consequently, concurrency coefficients for the existing speed tiers are updated, and the number of ports for the site is re-evaluated.

Other embodiments may be partially or wholly implemented on a computer-readable medium, for example, by storing computer-executable instructions or modules, or by utilizing computer-readable data structures.

Of course, the methods and systems of the above-referenced embodiments may also include other additional elements, steps, computer-executable instructions, or computer-readable data structures. In this regard, other embodiments are disclosed and claimed herein as well.

The details of these and other embodiments are set forth in the accompanying drawings and the description below. Other features and advantages of the embodiments will be apparent from the description and drawings, and from the claims.

BRIEF DESCRIPTION OF THE DRAWINGS

The present disclosure is illustrated by way of example and not limited in the accompanying figures in which like reference numerals indicate similar elements and in which:

FIG. 4 shows an example for obtaining concurrency as a function of subscriber bandwidth in accordance with aspects of the embodiments.

DETAILED DESCRIPTION

According to an aspect of the embodiments, the impact of changes to speed (data) tier penetrations and service offers to bandwidth consumption is forecasted. Traditional systems typically use either an assumed growth rate or a calculated growth rate from historical data. Consequently, traditional systems typically do not account for the introduction of new speed tiers and the impact of the new speed tiers on congested data ports of a service provider's equipment.

Figure 1:
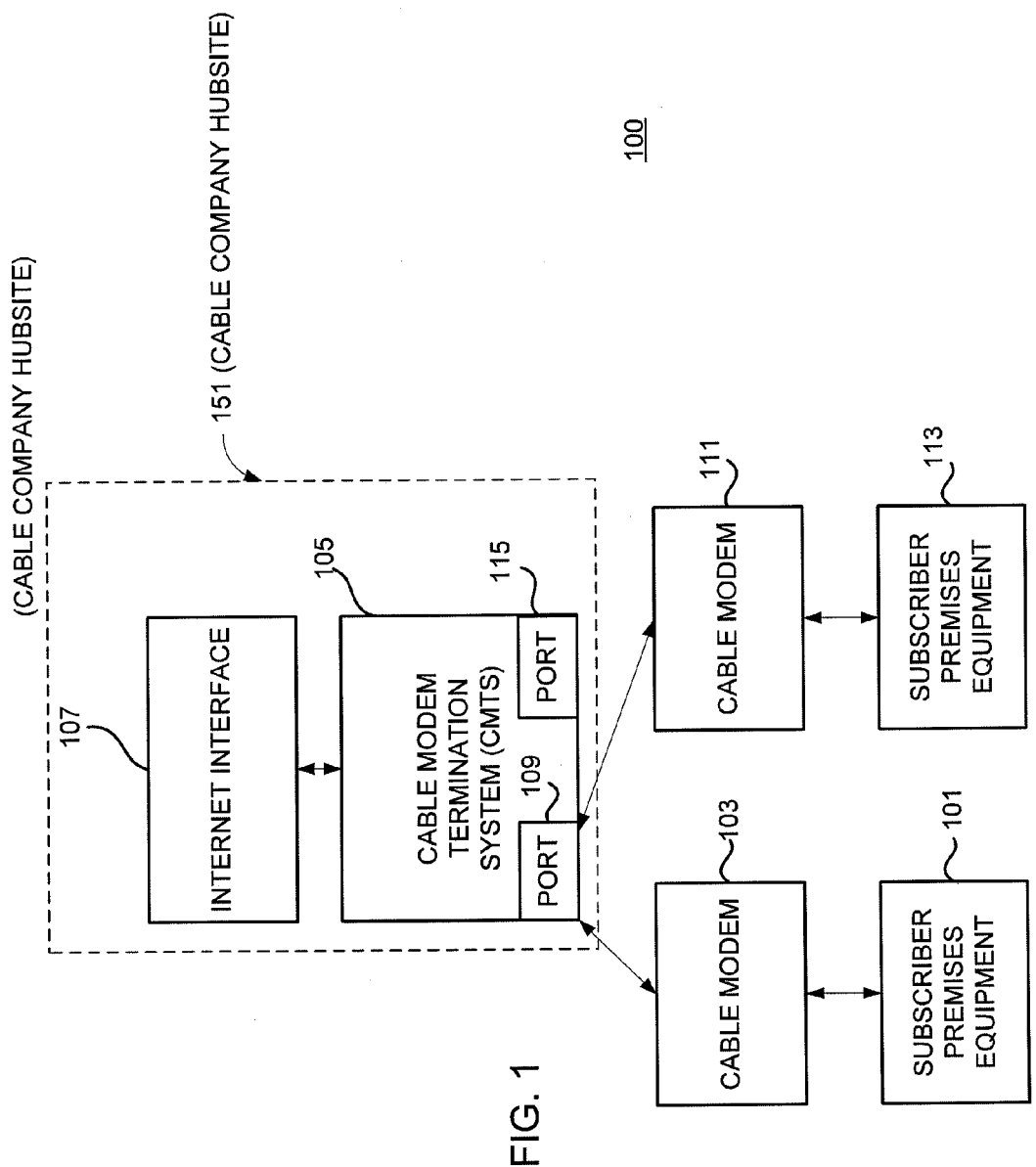
FIG. 1 shows a cable system that provides data services in accordance with aspects of the embodiments.

FIG. 1 shows cable system 100 that provides data services to a plurality of subscribers in accordance with aspects of the embodiments. The cable provider offers data services through hubsite (headend) 151 to each subscriber through an assigned cable modem (e.g., cable modems 103 and 111) to the subscriber's equipment (e.g., equipment 101 and 103). Each cable modem is connected to an assigned port (e.g., port 109 and 115) of a cable modem termination system (e.g., CMTS 105), where ports may be statically or dynamically assigned to subscribers to support data services. For example, port 109 may have a total data capacity of 3880 Kbps. If the bandwidth per subscriber (subscriber bandwidth) is 50 Kbps, then the port can support approximately 77 subscribers (3880/50). Each CMTS is connected to the Internet through an Internet interface (e.g., Internet interface 107) to provide connectivity to the Internet. The Internet typically provides connectivity to websites and well as provides connectivity to other CMTSs.

While FIG. 1 only illustrates one cable modem termination system (CMTS 105), cable system 100 typically includes a plurality of CMTSs (data sites) that may number in the hundreds or thousands of data sites and that may be geographically dispersed. Also, CMTS 105 typically supports a plurality to ports, e.g., ports 109 and 115. (While FIG. 1 does not explicitly show subscribers being assigned to port 115, port 115 is typically assigned the same number of subscribers as port 109.) For example, if CMTS 105 is engineered to support 5000 subscribers with ports that can each support 3880 Kbps (as described above), then CMTS 105 would need to be equipped with at least 65 ports.

CMTS 105 is typically scalable, i.e., adding a port increases the subscriber capacity for a given subscriber bandwidth by a fixed incremental amount (e.g., 77 subscribers or a total bandwidth capability of 3880 Kbps as discussed above). However, when the scalable limits are reached, another CMTS may be added to hubsite 151.

Figure 2:
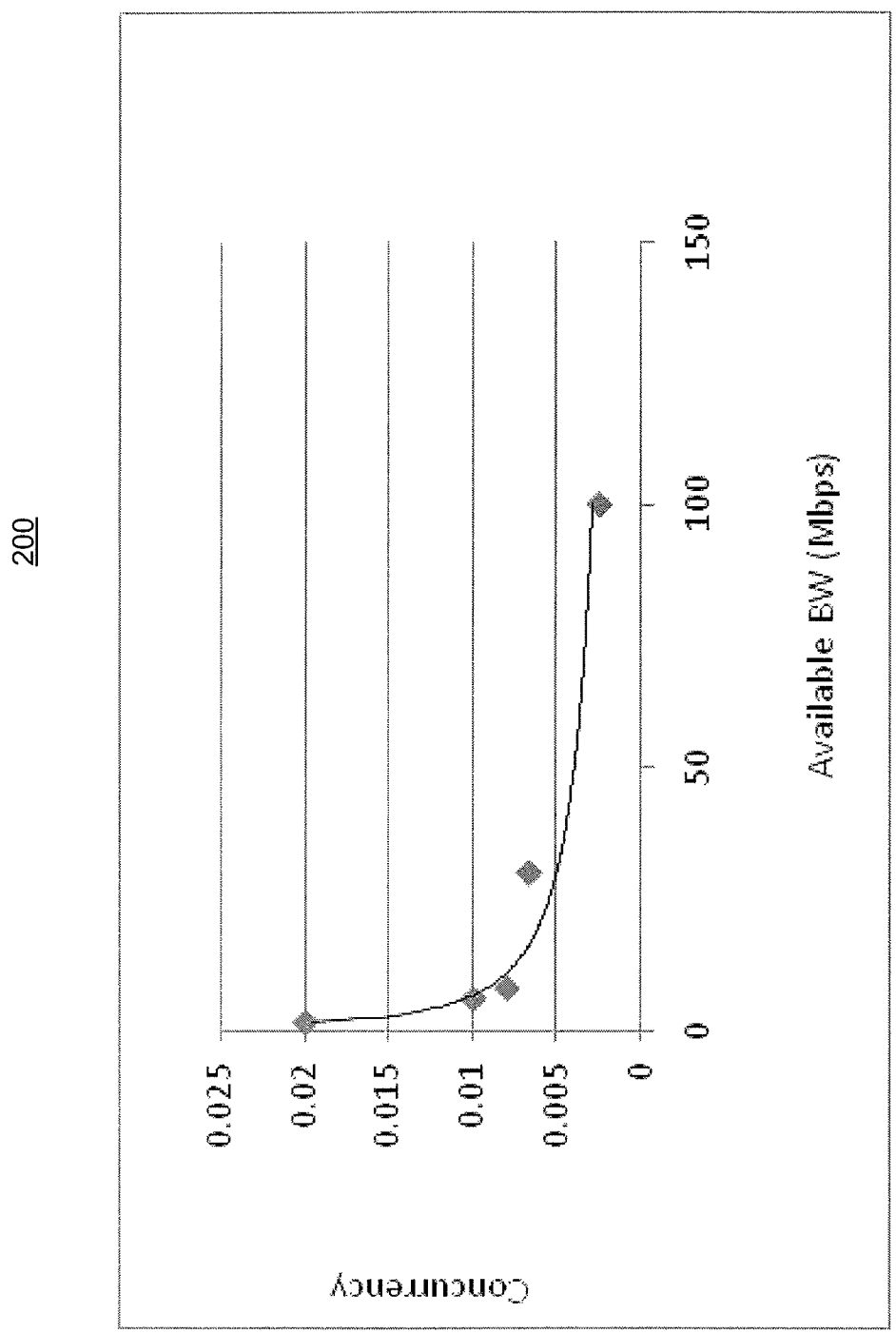
FIG. 2 shows an exemplary relationship between concurrency and available bandwidth in accordance with aspects of the embodiments.

FIG. 2 shows exemplary relationship 200 between concurrency and available bandwidth in accordance with aspects of the embodiments. The concurrency is often defined as fraction or percentage of assigned subscribers that are active at a given time (i.e., simultaneously active). In general for a fixed consumption, a data speed increase results in shorter bursts and consequently lowers the concurrency.

Each subscriber is typically assigned to a speed (data) tier, in which the subscriber is limited to an average maximum data rate. For example, if a subscriber is assigned to an 8 Mbps speed tier, the subscriber is limited to an average maximum data rate of 8 Mbps, although the subscriber may utilize more than 8 Mbps at a particular time instance. During a peak time, each subscriber on average may consume a measured bandwidth (referred to as bandwidth per subscriber or the subscriber bandwidth).

With exemplary relationship 200, the concurrency for either the uplink or downlink increases as the available bandwidth of the assigned port decreases. In other words, as more bandwidth is available, a subscriber is able to download or upload files faster so that the fraction of subscribers is smaller.

Figure 3:
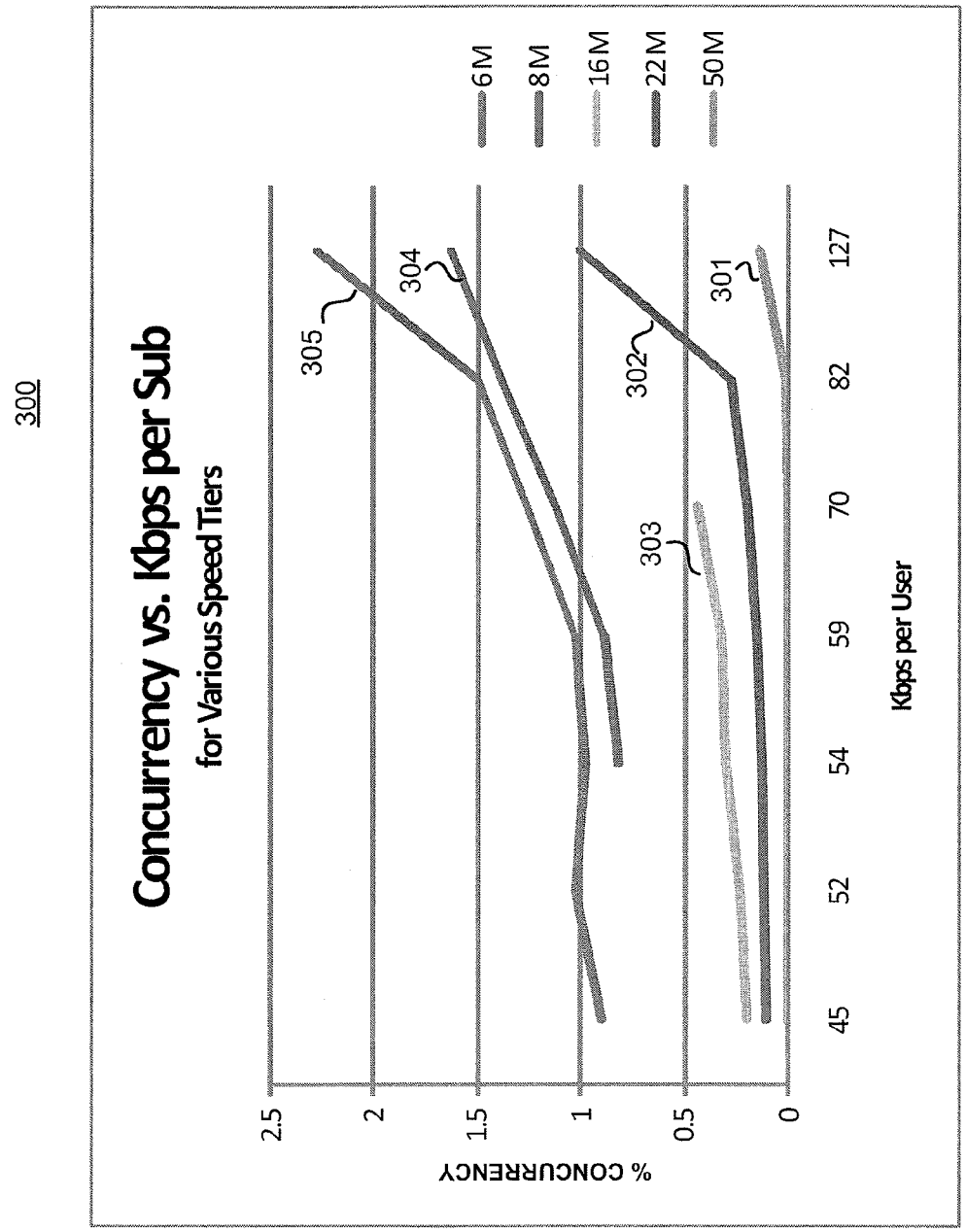
FIG. 3 shows an exemplary relationship between concurrency and subscriber bandwidth for various speed tiers in accordance with aspects of the embodiments.

FIG. 3 shows exemplary relationship 300 between concurrency and subscriber bandwidth for various speed tiers in accordance with aspects of the embodiments. As will be discussed, existing speed tiers may include 6 Mbps (corresponding to curve 305), 8 Mbps (curve 304), and 16 Mbps (curve 303). The cable provider may migrate subscribers to higher speed tiers in order to be more competitive with competing data services. Consequently, as discussed in an exemplary embodiment, new speed tiers may be offered at 22 Mbps (curve 302) and 50 Mbps (curve 301). As will be discussed, concurrency curves for the new speed tiers (curves 301 and 302) may be predicted based on the concurrency curves for the existing speed tiers. In general, as illustrated in FIG. 3, the concurrency decreases with higher speed tiers and increases as the bandwidth per subscriber increases.

FIG. 3 suggests that as the congestion increases, the concurrency tends to increases. This observation is intuitively appealing because data retransmission typically increases with greater congestion.

FIG. 4 shows an example for obtaining concurrency coefficients as a function of subscriber bandwidth in accordance with aspects of the embodiments. The concurrency may be expressed as:

$$\text{concurrent\_bandwidth} = \sum_{i=1}^{N} c_i * p_i * s_i \qquad \text{(EQ. 1)}$$

where N is the number of existing speed tiers, p is the penetration for the $i^{th}$ speed tier, and s is the speed for the $i^{th}$ speed tier. In the example shown in FIG. 4, the existing speed tiers are 16 Mbps, 8 Mbps, 6 Mbps, 4 Mbps, and 0768 Mbps. The impact of 4 Mbps and 0.768 Mbps is deemed as being small so that the 4 Mbps and 0.768 Mbps are ignored in the exemplary embodiment. However, embodiments may include concurrency coefficients for each of the 5 speed tiers. Consequently, only speed tiers ($s_i$) are included in EQ. 1. In order to determine the concurrency coefficients for the existing speed tiers, the active subscribers per speed tier ($p_i$) and utilized bandwidth per subscriber (concurrent_bandwidth) are observed at a peak timeframe for each site (CMTS). A set of N simultaneous equations having a form as shown in EQ. 1 may be solved to obtain the N unknown concurrency coefficients. With the exemplary embodiment having existing speed tiers 16 Mbps, 8 Mbps, and 6 Mbps, there are three concurrency coefficients; thus at least three simultaneous equations are needed to solve for the concurrency coefficients.

Referring to FIG. 4, sites are grouped into a plurality of groups based on the observed bandwidth per subscriber. For example, concurrency coefficients 403, 404, and 405 are determined for group 401 and concurrency coefficients 406, 407, and 408 are determined for group 402. With the exemplary embodiment, groups are distinguished from each other by sufficiently different observed subscriber bandwidths.

To illustrate calculations using EQ. 1, assume that the observed bandwidth per subscriber is 76 Kbps, where 80%, 15%, and 5% of the subscribers are assigned to 6 Mbps, 8 Mbps, and 16 Mbps speed tiers, respectively. The corresponding concurrency equation is:

$$76\ \text{Kbps} = c1*0.8*6\ \text{Mbps} + c2*0.15*8\ \text{Mbps} + c3*0.05*16\ \text{Mbps} \quad (EQ.\ 2)$$

or $$1 = 63.2*c1 + 15.8*c2 + 10.5*c3 \quad (EQ.\ 3)$$

Sites with a similar observed bandwidth per subscriber are grouped together to obtain a sufficient number of simultaneous equations to solve for the concurrency coefficients. In this example, three simultaneous equations are necessary to solve for three unknowns. As shown in FIG. 4, Microsoft Office Excel® may be used to solve for the concurrency coefficients.

The applicability of EQ. 1 in FIG. 1 is illustrated in the following example to determine calculated bandwidth 409. Concurrency coefficients 406, 407, and 408 are approximately 3.433283, 13.87736, and 14.95212, respectively. (As shown in FIG. 4, the concurrency coefficients are multiplied by 100 for mathematical expediency. Consequently, calculated bandwidths are divided by 1000.) Applying EQ. 1:

$$\text{cal\_bw}*1000 \approx 3.43*0.033*16\ M + 13.88*0.053*8\ M + 14.95*0.74*6\ M \quad (EQ.\ 4)$$

$$\text{cal\_bw} \approx 74.07\ \text{Kbps} \quad (EQ.\ 5)$$

The value of EQ. 5 is slightly different from calculated_BW 409 because the effects of the 4 Mbps and 0.768 Mbps tiers are ignored in the above calculation.

Figure 5:
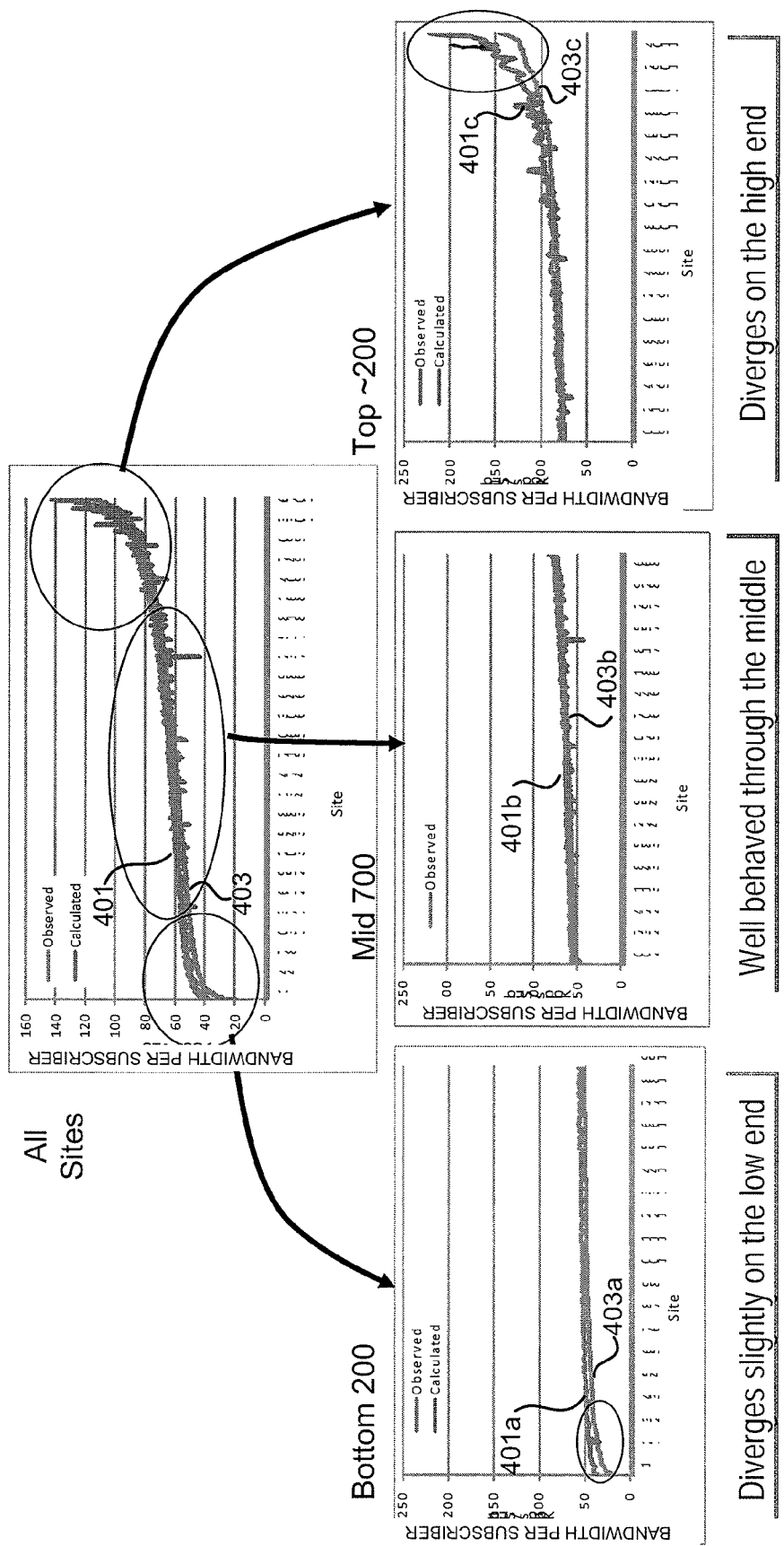
FIG. 5 shows an example of observed subscriber bandwidth and calculated subscriber bandwidth in accordance with aspects of the embodiments.

FIG. 5 shows an example of observed subscriber bandwidth and calculated subscriber bandwidth in accordance with aspects of the embodiments. Sites are ranked ordered by increasing value of bandwidth per subscriber, where curve 403 corresponds to the observed bandwidth per subscriber and curve 401 corresponds to the calculated bandwidth per subscriber (based on the determined concurrency coefficients). Curves 403a and 401a, 403b and 401b, and 403c and 401c correspond to the low range, middle range, and high range of the sites, respectively. While function 401 is well behaved in the middle range, there is some divergence in the low and high ranges. However, the difference between the observed bandwidth and calculated bandwidth is typically sufficiently small. With the example shown in FIG. 5, the predicted bandwidth is ±15% for 94% of the sites.

Figure 12:
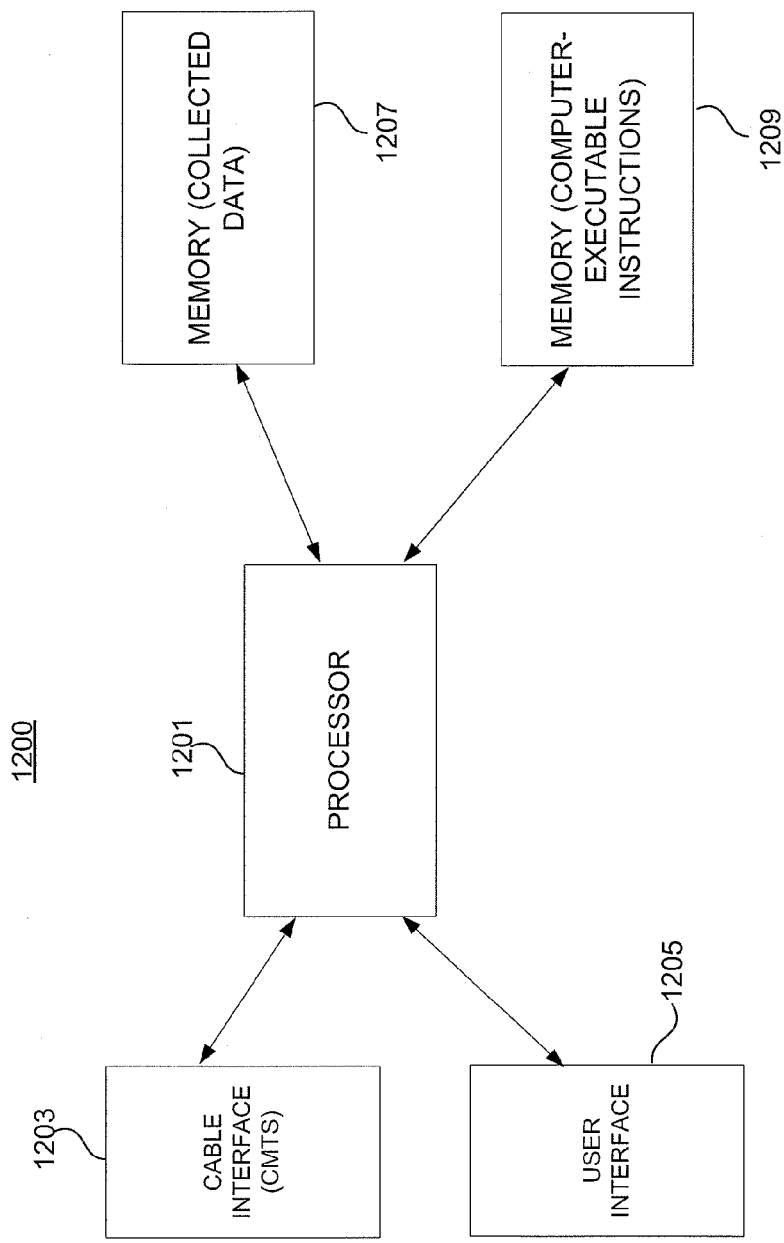
FIG. 12 shows an apparatus that supports planning CMTS configurations with new speed tiers in accordance with aspects of the embodiments.

In addition to applying a growth rate to per subscriber usage at a site, some embodiments may use a site's particular characteristics to solve for concurrencies per speed tier. From the per site concurrencies, system 1200 (as shown in FIG. 12) estimates the existing usage based on the number of existing subscribers per speed tier and the usage patterns of the speed tiers. For example, system 1200 may collect updated data (e.g., observed subscriber bandwidth) from CMTS 105 and recalculate the concurrency coefficients to re-characterize the usage characteristics of subscribers. For example, subscribers may be using new data services that impact an engineered CMTS based on an older set of assumptions. In addition, the concurrencies may then be used to estimate the impact of introducing new speed tiers or penetration changes among the existing speed tiers. Consequently, system 1200 may estimate both existing usage and future usage based on a particular mix of speed tiers and penetrations unique to a particular site.

Figure 6:
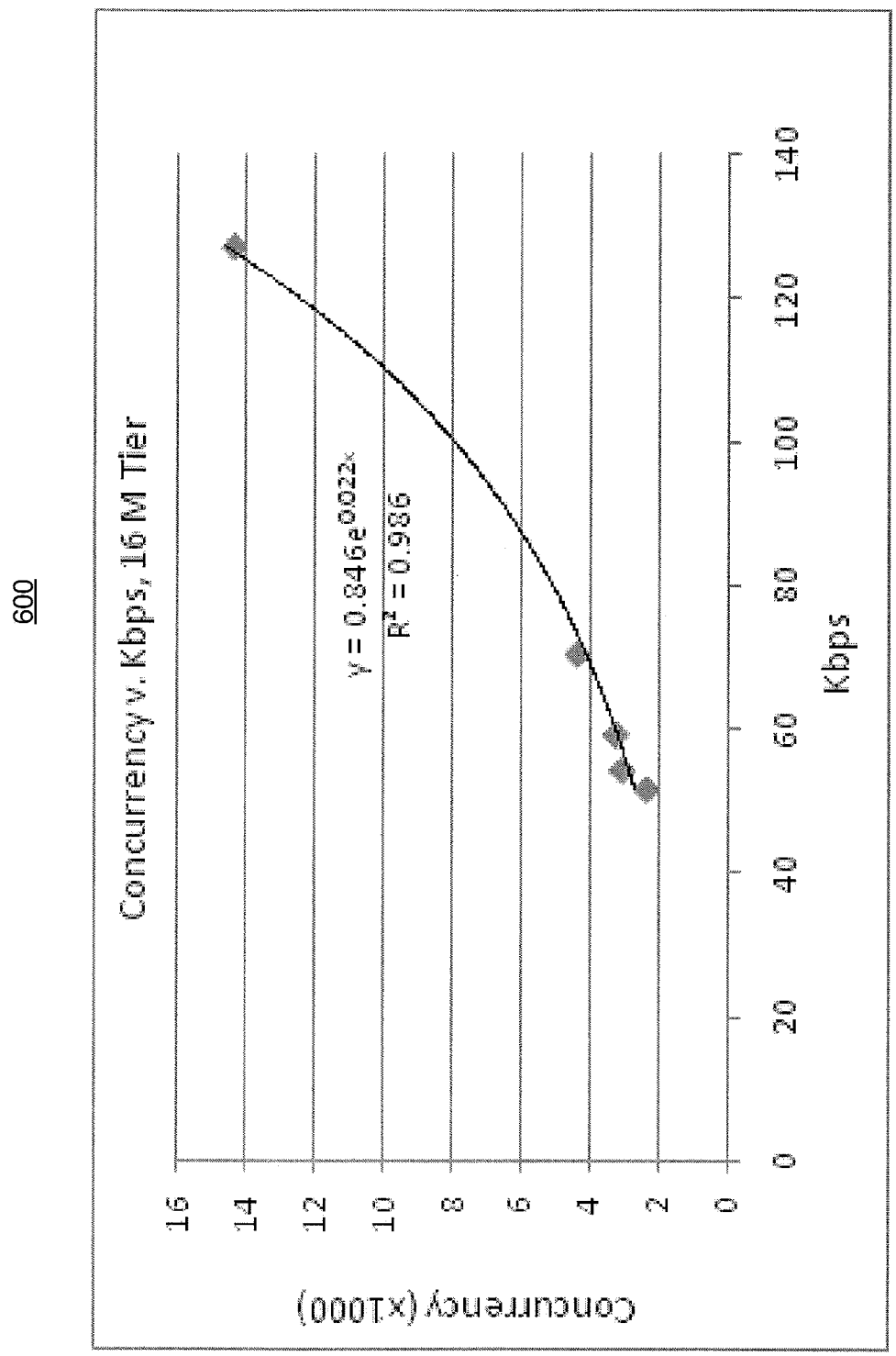
FIG. 6 shows an exemplary concurrency curve for an existing 16 Mbps tier in accordance with aspects of the embodiments.
Figure 7:
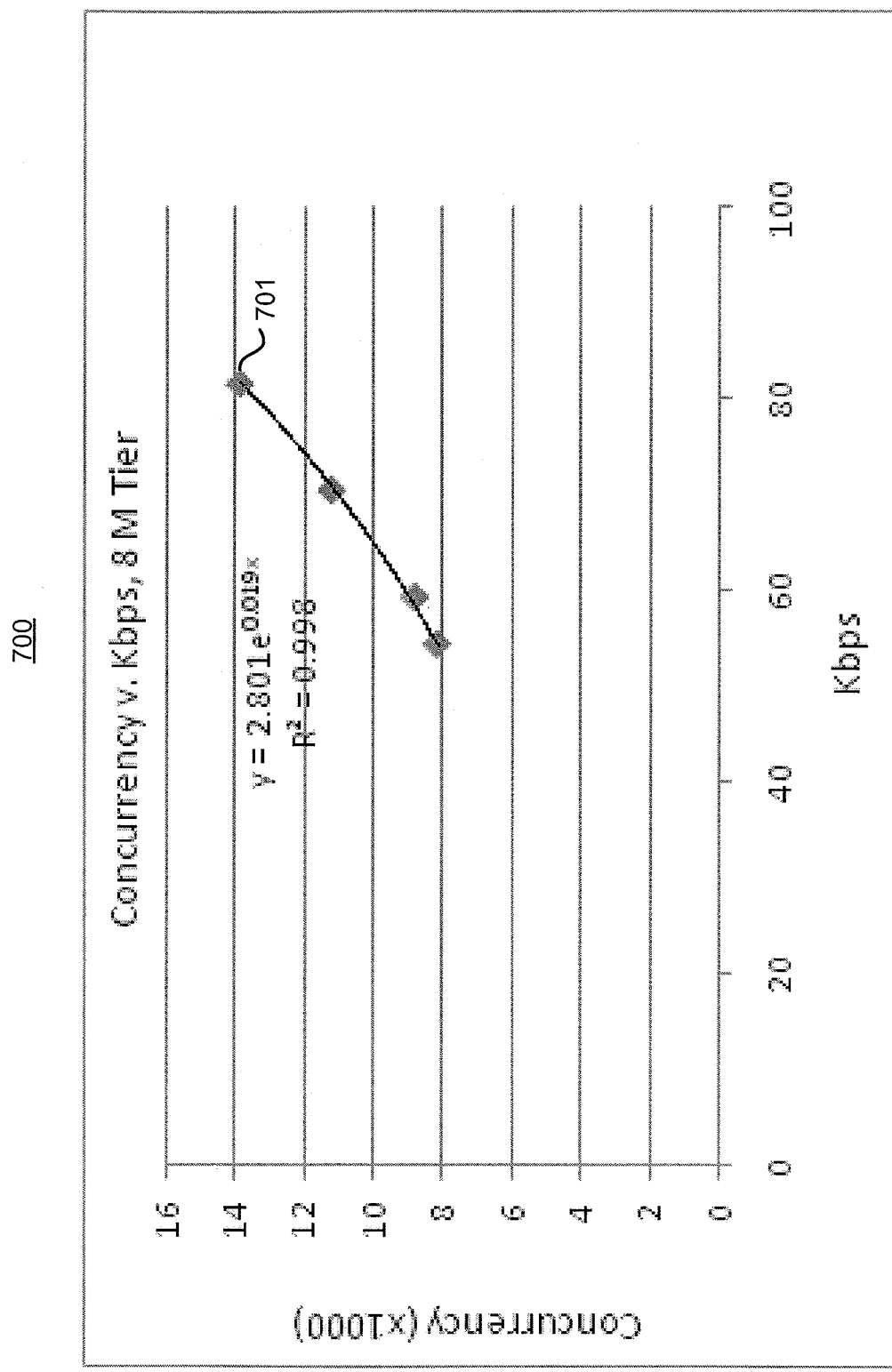
FIG. 7 shows an exemplary concurrency curve for an existing 8 Mbps tier in accordance with aspects of the embodiments.
Figure 8:
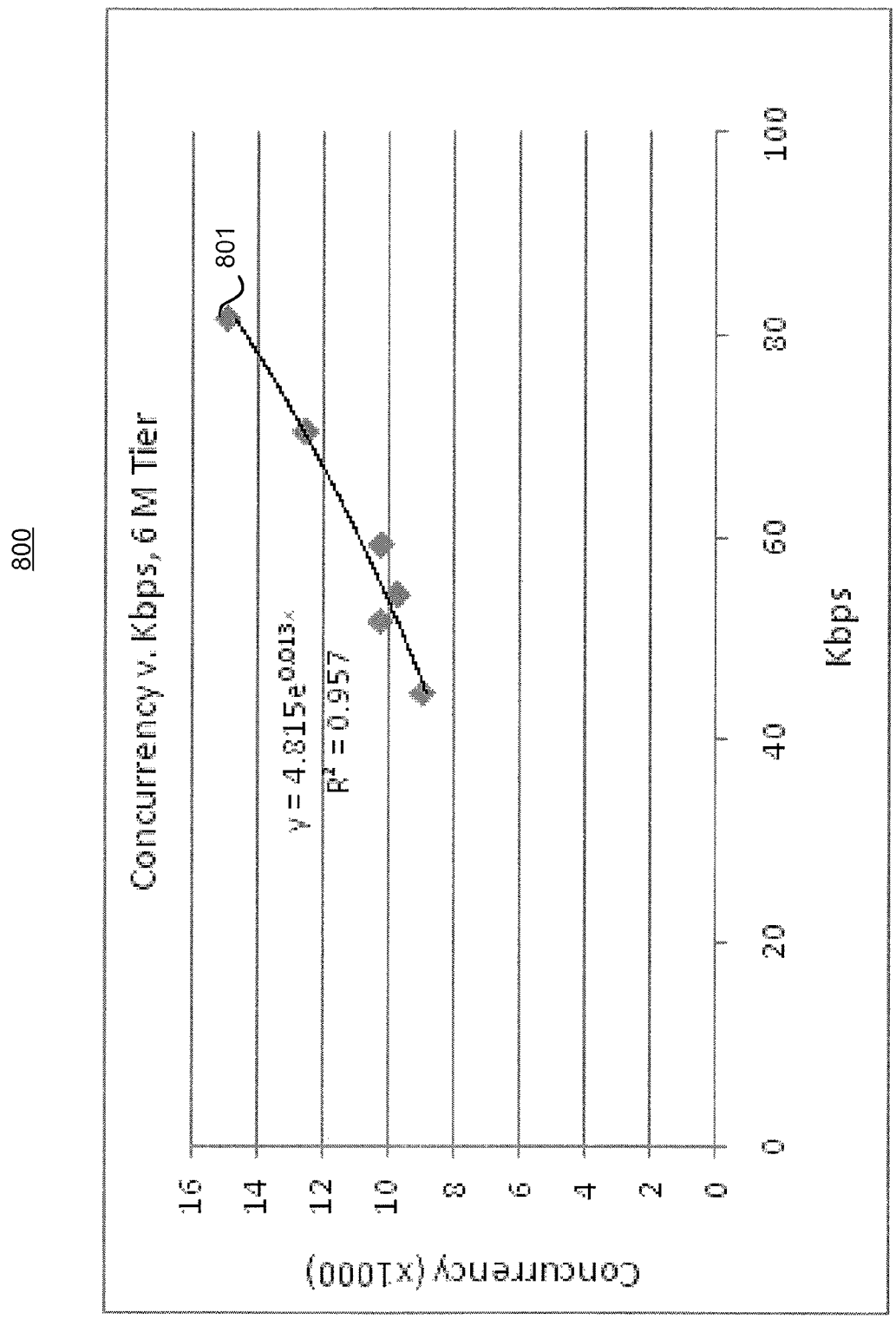
FIG. 8 shows an exemplary concurrency curve for an existing 6 Mbps tier in accordance with aspects of the embodiments.

FIGS. 6, 7, and 8 show exemplary concurrency curves 600, 700, and 800 for 16 Mbps, 8 Mbps, and 6 Mbps tiers, respectively, in accordance with aspects of the embodiments. With some embodiments, for each of the concurrency curves, data points are obtained from the determined concurrency coefficients for the site groups as exemplified in FIG. 4. For example, point 701 corresponds to concurrency coefficient 407 (with an approximate value of 13.9) and point 801 corresponds to concurrency coefficient 408 (with an approximate value of 15.0), where group 402 is characterized by a bandwidth per subscriber of approximately 85 Kbps. The other data points may be determined from the concurrency coefficients for other groups that are characterized by different values of subscriber bandwidths.

With some embodiments, Microsoft Office Excel® is used to fit concurrency curves through the obtained data points, where the concurrency curves have the form of $a*e^{bx}$, and where a and b are constants, x is the value of subscriber bandwidth, and y is the concurrency*1000.

With the exemplary embodiment shown in FIGS. 6, 7, and 8, fitted curves 600, 700, and 800 have exponential forms. Regressions are all above 95% R-squared. As the observed subscriber bandwidth increases, the concurrency per speed tier increases. The increase in concurrency is proportionally larger as the subscriber bandwidth increases. This characteristic is intuitively appealing because higher speed tiers are more influenced by congestion. In other words, it takes longer for everyone to do everything as the communication pipe gets congested.

Figure 9:
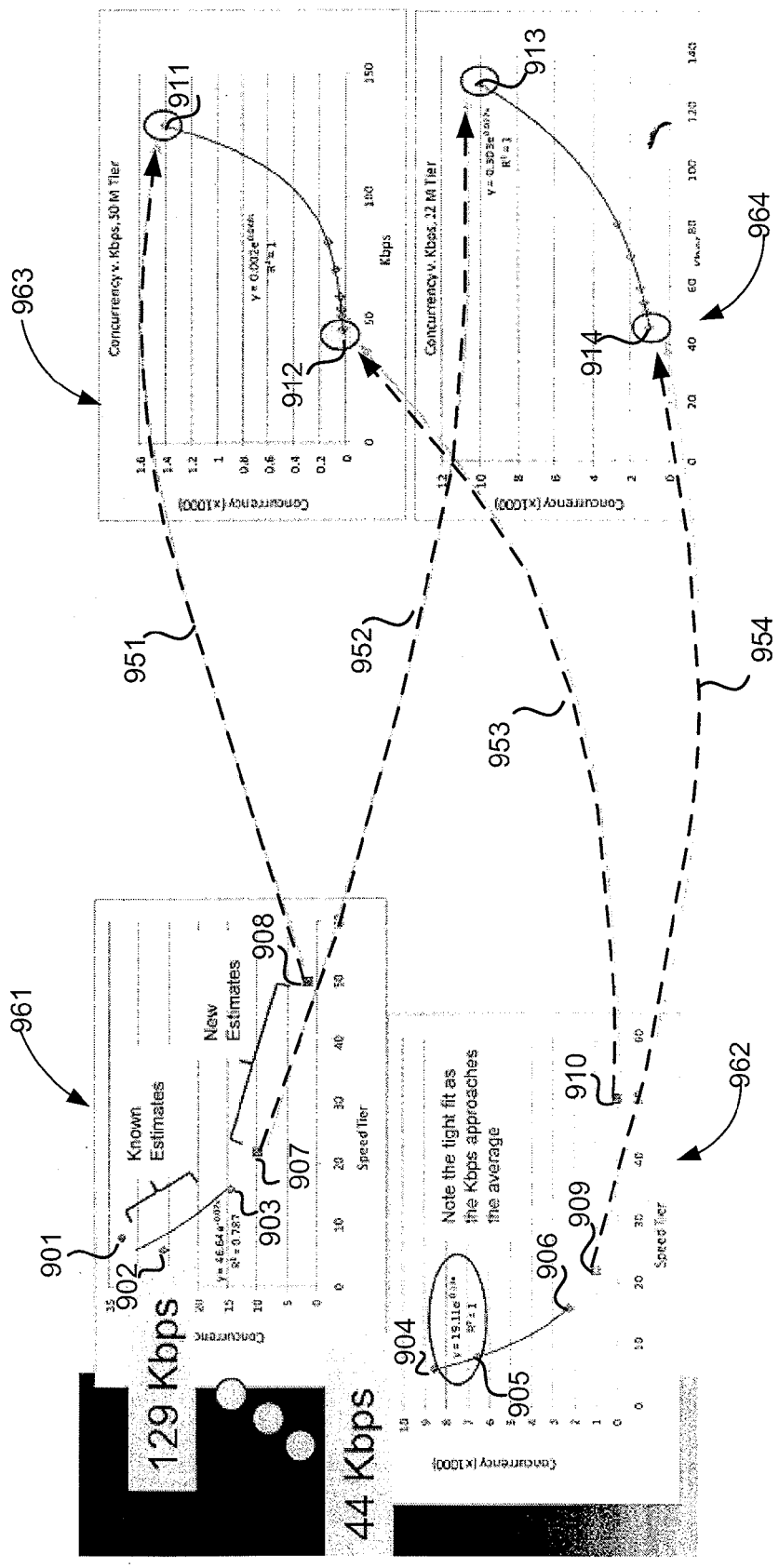
FIG. 9 shows an example for obtaining concurrency curves for new speed tiers in accordance with aspects of the embodiments.

FIG. 9 shows an example for obtaining concurrency curves 963 and 964 for new speed tiers in accordance with aspects of the embodiments. Speed tier curves 961 and 962 (which relate the concurrency for different speed tiers including existing speed tiers and new speed tiers) are derived from concurrency curves 600, 700, and 800 for a plurality of subscriber bandwidths (e.g., 129 Kbps and 44 Kbps). For example, points 901 and 904 are obtained from concurrency curve 600 (16 Mbps tier). Points 902 and 905 are obtained from concurrency curve 700 (8 Mbps tier). Points 903 and 906 are obtained from concurrency curve 800 (6 Mbps tier).

Speed tier curves 961 and 962 (as well as other speed tier curves for other subscriber bandwidths not explicitly shown in FIG. 9) are extended to other speed tiers (including the new speed tiers) by fitting a curve (e.g., with the form $a*e^{bx}$), through the points obtained from curves 600, 700, and 800 to obtain points 907 and 908 (extrapolated curve 961) and points 909 and 910 (extrapolated curve 962).

New concurrency curves 963 and 964 are constructed from the new estimates (907, 908, 909, and 910 as well as points corresponding to other subscriber bandwidths not explicitly shown in FIG. 9). For example, points 911, 912, 913, and 914 are obtained from points 908 (mapping 951), 910 (mapping 953), 907 (mapping 952), and 909 (mapping 954), respectively. As will be further discussed, concurrency coefficients for the new speed tiers (22 Mbps tier and 50 Mbps tier) can then be obtained from concurrency curves 963 and 964.

Figure 10:
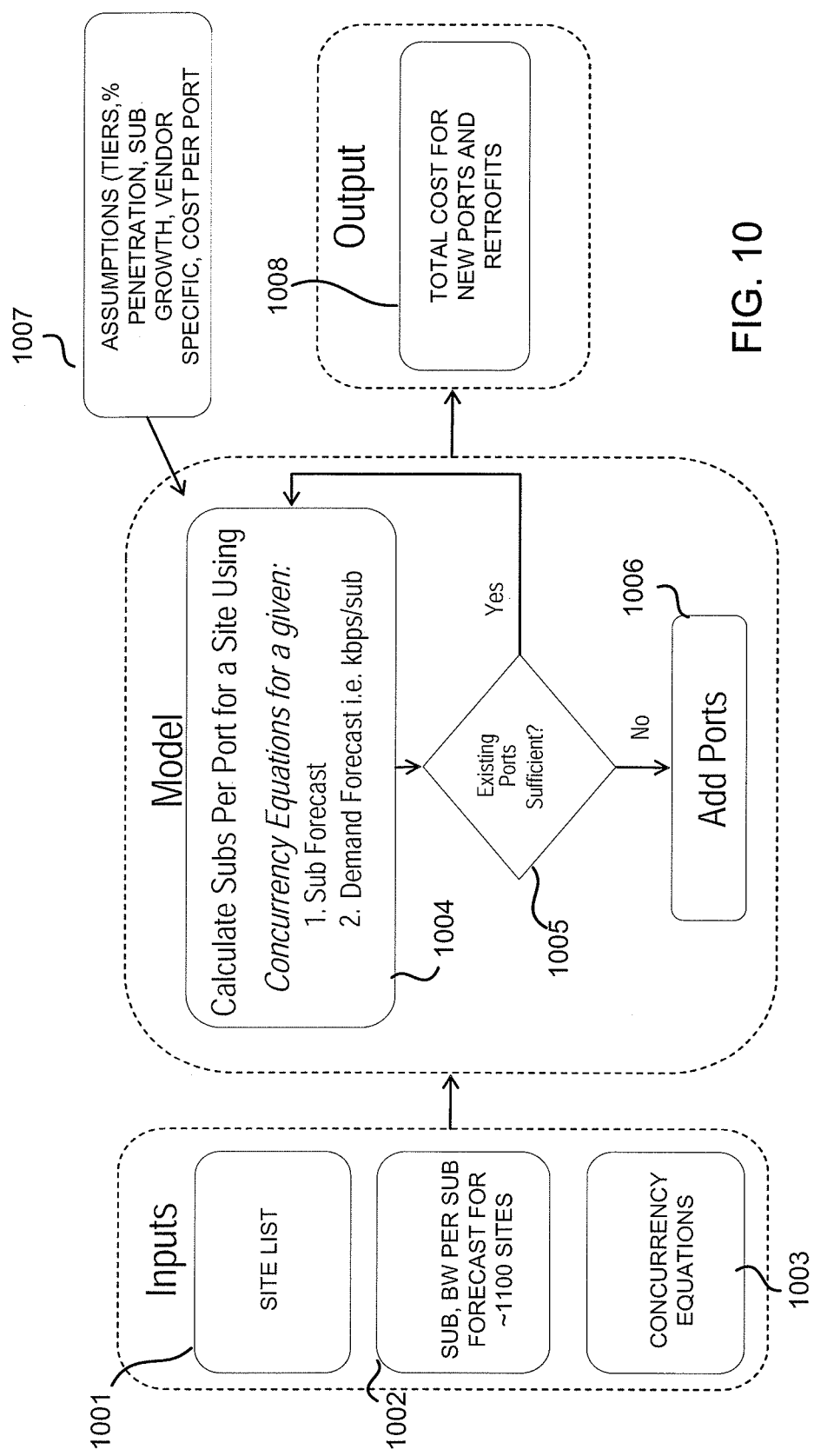
FIG. 10 shows a flow diagram for determining a port configuration for a cable modem termination system (CMTS) in accordance with aspects of the embodiments.

FIG. 10 shows flow diagram 1000 for determining a port configuration for a cable modem termination system (CMTS)

in accordance with aspects of the embodiments. Process 1000 is directed to CMTS budget forecasting and estimating the impact of new speed tier launches on the CMTS plant.

Input 1001 provides site data (as exemplified in FIG. 4) so that concurrency equations 1003 for existing speed tiers and new speed tiers can be determined. As will be further discussed in an illustrative example, the forecasted subscriber bandwidth 1002 (i.e., with the new speed tiers) is determined for each of the sites based on the observed subscriber bandwidth. With some embodiments, sites may be grouped together based on bandwidth characteristics (e.g., groups 401 and 402 as shown in FIG. 4) in order to facilitate forecasting efforts.

Forecast model 1004 utilizes concurrency equations derived for the new speed tiers as well as assumptions 1007 about subscriber growth, consumption patterns, tier penetration, and cost per port. Consequently, the number of devices (subscribers) per port is forecasted. Some embodiments may make further assumptions to facilitate the forecast model. For example, typical usage growth may be assumed with expected consumption growth based on new applications that do not radically depart from the resource demands of current applications. However with some future applications (e.g., a bandwidth-intensive video service), consumption patterns may dramatically alter the required subscriber bandwidth. If that may be the case, closed loop forecasting any be used to counter disruptions. Closed loop forecasting may use observed behavior patterns and observed performance impacts of prior changes to forecast future changes. This approach is akin to a feedback loop in an amplifier, in which the feedback is intended to reduce the error in future estimates.

If step 1005 determines that the current numbers of ports cannot accommodate the expected subscriber group and forecasted subscriber bandwidth, additional ports are added to the CMTS in step 1006. Consequently, total cost 1008 for upgrading a site (CMTS) can be forecasted from the number of added ports and the cost per port.

The following example illustrates process 1000. Referring to FIG. 4 (entry 410), assume that the current subscriber bandwidth is 86 Kbps. With a total port bandwidth of 3880 Kbps, each port can accommodate 45 subscribers with the current speed tiers of 16 Mbps, 8 Mbps, and 6 Mbps speed tiers, where the impact of the 4 Mbps and 0.768 Mbps speed tiers are ignored. Assuming that the site currently supports 5000 subscribers, 111 ports are needed.

With the site upgrade, the example assumes that all of the 16 Mbps subscribers migrate to the 50 Mbps tier while all of the other subscribers migrate to the 22 Mbps tier. In other words, 10% of the subscribers are assigned to the 50 Mbps tier and 90% of the subscribers are assigned to the 22 Mbps tier. Referring to FIG. 9, the concurrency coefficients for the new speed tiers with a current subscriber bandwidth of 86 Kbps are approximately 0.15 (corresponding to 50 Mbps tier) and 3.0 (corresponding to 22 Mbps tier. Using EQ. 1, the new subscriber bandwidth is determined by:

$$1000*\text{forecasted\_sub\_BW}=0.1*01.5*50 \text{ Mbps}+0.9*3.0*22 \text{ Mbps} \quad \text{(EQ. 6)}$$

$$\text{forecasted\_sub\_BW}=60 \text{ Kbps} \quad \text{(EQ. 7)}$$

The above example illustrates a reduction of subscriber bandwidth with higher speed tiers because of an increased efficiency resulting from a reduction of congestion. In other words, if subscribers do not change their behavior but can do what they were doing faster, then the effect should be less congestion The example further assumes a subscriber growth of 25% (6000 subscribers) and a subscriber bandwidth increase of 25% (75 Kbps) to accommodate new applications. Forecast model 1004 predicts that each port can support 50 subscribers (3880/75) and consequently 120 ports (6000/50) are needed. In other words, 9 ports need to be added to the site. The above example can then be extended to the other sites.

Figure 11:
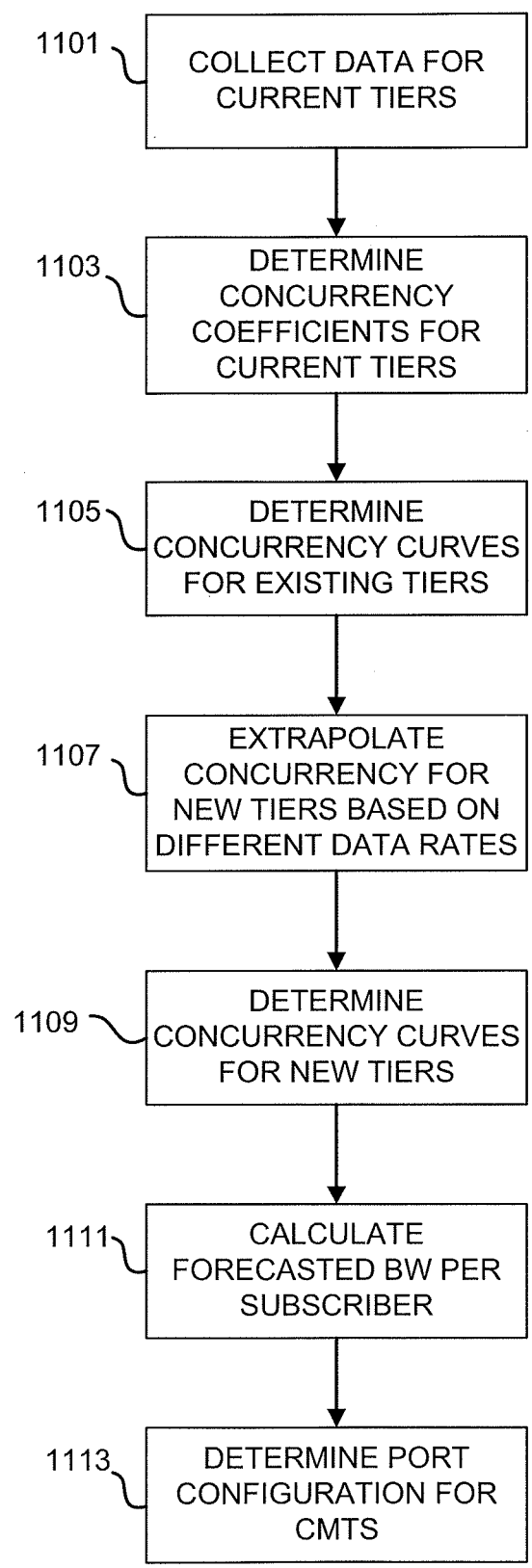
FIG. 11 shows a flow diagram for predicting the subscriber bandwidth with new speed tiers from observed subscriber bandwidth with current speed tiers in accordance with aspects of the embodiments.

FIG. 11 shows flow diagram 1100 for predicting the subscriber bandwidth with new speed tiers from observed subscriber bandwidth with current speed tiers in accordance with aspects of the embodiments. In step 1101, data is collected for the different sites (FIG. 4) so that concurrency equations (EQ. 1) can be determined in step 1103. In step 1105, concurrency curves are constructed for the existing speed tiers (e.g., 6 Mbps, 8 Mbps, and 16 Mbps) as shown in FIGS. 6, 7, and 8.

In step 1107, speed tier curves (curves 961 and 962 as shown in FIG. 9) are extrapolated for different subscriber bandwidths in order to obtain new estimates for the new speed tiers. The new estimates are then mapped to new concurrency curves (curves 963 and 964) for the new speed tiers in step 1109. Concurrency coefficients are than obtained from the current subscriber bandwidth so that the forecasted subscriber bandwidth can be predicted using EQ. 1 in step 1111. Consequently, the number of subscribers per port can be forecasted for the new tiers. Assuming subscriber growth and forecasted consumption pattern, the required number of ports is determined for each site in step 1113.

FIG. 12 shows apparatus 1200 that supports planning CMTS configurations with new speed tiers in accordance with aspects of the embodiments. With some embodiments, apparatus 1200 comprises a computer platform that supports processes 1000 (FIG. 10) and 1100 (FIG. 11) as disclosed herein.

Apparatus 1200 interfaces to a plurality of cable mobile termination systems (e.g., CMTS 105 as shown in FIG. 1) through cable interface 1203 to obtain observed performance data (e.g., observed bandwidth per subscriber), which may be stored in memory 1207. Apparatus 1200 may use the observed performance data so that processor 1201 can determine whether additional data ports should be added the CMTS by executing processes 1000 and 1100 in order to handle forecasted data traffic when new speed tiers are introduced.

Apparatus 1200 determines the number of ports that are required of a CMTS as discussed herein and configures the CMTS through 1203 in accordance with the forecast.

With some embodiments, a user may interact with processes 1000 and 1100 through user interface 1205. For example, a user may specify the grouping of sites (e.g., CMTSs) according to observed values of bandwidth per subscriber and obtain concurrency coefficients for existing speed tiers by executing Microsoft Office Excel® as shown in FIG. 4. The user may further execute Microsoft Office Excel® to obtain new concurrency coefficients to determine the subscriber bandwidth with the new speed tiers.

Processor 1201 may execute computer executable instructions from a computer-readable medium, e.g., memory 1209. Computer storage media may include volatile and nonvolatile, removable and non-removable media implemented in any method or technology for storage of information such as computer readable instructions, data structures, program modules or other data.

While the exemplary embodiments have been discussed in broad terms of a cable communications networking environment, the embodiments may be configured for other networking environments including telecommunications environments.

What is claimed is:

1. A method, comprising:
    determining, using a computer, a plurality of concurrency coefficients based on observed bandwidth, wherein the plurality of concurrency coefficients correspond to a plurality of speed tiers of a service provider network;
    determining, using the computer, an additional concurrency coefficient based on the plurality of concurrency coefficients, wherein the additional concurrency coefficient corresponds to an additional speed tier not included in said plurality of speed tiers;
    determining a port configuration based on the additional concurrency coefficient; and
    configuring ports based on the determined port configuration.

2. The method of claim 1, wherein the observed bandwidth comprises an observed bandwidth at a plurality of network sites.

3. The method of claim 1, wherein the observed bandwidth comprises an observed bandwidth at a modem of the service provider network.

4. The method of claim 1, wherein the observed bandwidth comprises an observed bandwidth at a headend of the service provider network.

5. The method of claim 1, wherein said determining the additional concurrency coefficient comprises:
    determining a concurrency curve based on the plurality of concurrency coefficients; and
    extrapolating the concurrency curve for the additional speed tier.

6. The method of claim 1, wherein said determining the port configuration comprises determining a port configuration of a modem of the service provider network, and wherein said configuring the ports comprises configuring ports of the modem.

7. The method of claim 1, wherein said determining the port configuration comprises determining a quantity of ports, and wherein said configuring the ports comprises adding a number of ports to a site based on the determined quantity of ports.

8. An apparatus, comprising:
    a memory storing executable instructions; and
    a processor configured to execute the executable instructions so as to perform:
        determining a plurality of concurrency coefficients based on observed bandwidth, wherein the plurality of concurrency coefficients correspond to a plurality of speed tiers of a service provider network;
        determining an additional concurrency coefficient based on the plurality of concurrency coefficients, wherein the additional concurrency coefficient corresponds to an additional speed tier not included in said plurality of speed tiers; and
        determining a port configuration based on the additional concurrency coefficient.

9. The apparatus of claim 8, wherein the observed bandwidth comprises an observed bandwidth at a plurality of network sites.

10. The apparatus of claim 8, wherein the observed bandwidth comprises an observed bandwidth at a modem of the service provider network.

11. The apparatus of claim 8, wherein the observed bandwidth comprises an observed bandwidth at a headend of the service provider network.

12. The apparatus of claim 8, wherein said determining the additional concurrency coefficient comprises:
    determining a concurrency curve based on the plurality of concurrency coefficients; and
    extrapolating the concurrency curve for the additional speed tier.

13. The apparatus of claim 8, wherein said determining the port configuration comprises determining a port configuration of a modem of the service provider network.

14. The apparatus of claim 8, wherein said determining the port configuration comprises determining a quantity of ports.

15. A method, comprising:
    determining, using a computer, a plurality of concurrency curves based on observed bandwidth, wherein the plurality of concurrency curves correspond to a plurality of speed tiers of a network;
    determining, using the computer, an additional concurrency curve based on the plurality of concurrency curves, wherein the additional concurrency curve corresponds to an additional speed tier not included in said plurality of speed tiers;
    determining a port configuration based on the additional concurrency curve; and
    configuring ports based on the determined port configuration.

16. The method of claim 15, wherein the observed bandwidth comprises an observed bandwidth at a modem of the network.

17. The method of claim 16, wherein said determining the port configuration comprises determining a port configuration of the modem, and wherein said configuring the ports comprises configuring ports of the modem.

18. The method of claim 15, wherein said determining the port configuration comprises determining a quantity of ports, and wherein said configuring the ports comprises adding a number of ports to a site based on the determined quantity of ports.

19. The method of claim 15, wherein said determining the additional concurrency curve comprises fitting the additional concurrency curve through points in the plurality of concurrency curves.

20. The method of claim 15, further comprising determining a bandwidth based on the additional concurrency curve, wherein said determining the port configuration comprises determining the port configuration based on the determined bandwidth.

* * * * *

UNITED STATES PATENT AND TRADEMARK OFFICE
CERTIFICATE OF CORRECTION

PATENT NO.         : 8,451,746 B2
APPLICATION NO.    : 13/221105
DATED              : May 28, 2013
INVENTOR(S)        : John Paclik et al.

It is certified that error appears in the above-identified patent and that said Letters Patent is hereby corrected as shown below:

In the Specification

In Column 4, Line 55:
 delete "0768 Mbps." and insert -- 0.768 Mbps. --

Signed and Sealed this
Tenth Day of February, 2015

Michelle K. Lee
*Deputy Director of the United States Patent and Trademark Office*